Jan. 25, 1949.　　　　G. A. GEYER　　　　2,459,808
TUBE EXPANDER WITH EXPANSIBLE BALL
DRIFT REMOVABLE BY ITS EXPANSION
Filed Oct. 11, 1945

INVENTOR.
George A. Geyer
BY
ATTORNEY.

Patented Jan. 25, 1949

2,459,808

UNITED STATES PATENT OFFICE 2,459,808

TUBE EXPANDER WITH EXPANSIBLE BALL DRIFT REMOVABLE BY ITS EXPANSION

George A. Geyer, New York, N. Y.

Application October 11, 1945, Serial No. 621,651

4 Claims. (Cl. 153—80)

(Granted under the act of March 3, 1883, as amended April 30, 1928; 370 O. G. 757)

This invention relates to a tube expander of the type described in my United States Patent No. 2,155,416, issued April 25, 1939.

It is an object of this invention to provide a unitary tube expander of simplified and improved design.

Another object is to provide a ball-drift tube expander which can be readily assembled and mounted in power tools.

Another object is to provide a ball-drift tube expander in which the ball drift can be readily and quickly applied, removed and changed.

Another object is to provide a ball-drift tube expander all parts of which, with the exception of the ball drift, form an integral unit.

Figure 1:
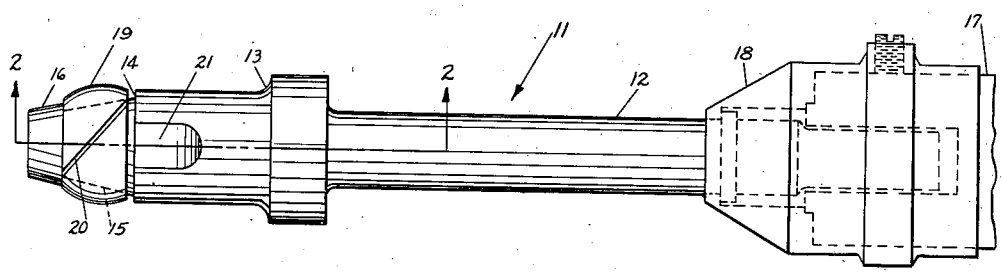
Figure 2:
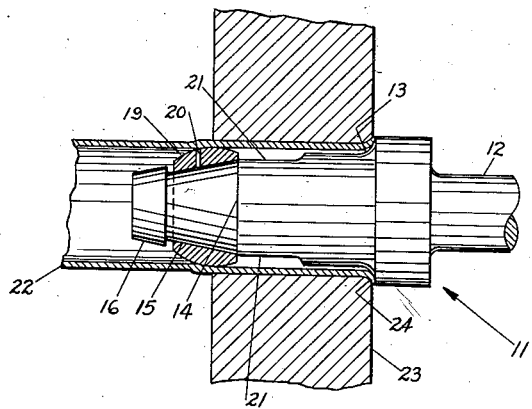

Further objects and advantages, as well as the construction, arrangement and operation, will be apparent from the following description and claims in connection with the accompanying drawings, in which, Fig. 1 is an elevational view of the unitary tube expander, mounted in a power tool, and Fig. 2 is a sectional view of the tube expander, partially in elevation, taken along the line 2—2 of Fig. 1, and shown in operating relationship with a condenser tube and sheet.

In the drawings there is shown a unitary tube-expander body 11 comprising a tool shank 12, a smoothly curved wedge portion 13, a frusto-conical taper portion 15 terminating in an enlarged portion or collar 14 at the end adjacent said wedge portion 13, and a ball drift retaining portion 16 at the other end. Shank 12 of body 11 is adapted to be mounted in the hammer end of a pneumatic hammer 17 or other power device, and to be retained therein, as by adapter 18.

About the frusto-conical taper portion 15 is located the internally conical externally rounded ball drift 19, the interior of the ball drift 19 being shaped to correspond with the shape of the taper portion 15. Extending through ball drift 19 is a diagonal slit 20.

The retaining portion 16 terminates the smallest diameter of the taper portion 15, the diameter of retaining portion 16 adjacent taper portion 15 being greater than the smallest diameter of taper portion 15, but not being greater than the greatest diameter of taper portion 15. Retaining portion 16 at no point has a diameter exceeding the diameter adjacent taper portion 15, and is preferably frusto-conical and shaped to correspond to a section of the interior of ball drift 19. A pair of opposed flats or recesses 21 are provided in collar 14, by means of which tools or other objects can be brought into bearing engagement with the adjacent end of ball drift 19. In Fig. 2 the device is shown in operative relationship with a condenser tube 22 and a tube sheet 23 provided with a flared opening 24.

The device can be utilized in the following manner: The body 11 can be mounted in pneumatic hammer 17 or in any other power device capable of exerting intermittent or continuous pressure, and secured therein, as by adapter 18. A ball drift 19 is selected and placed on taper portion 15 by forcing it over and beyond retaining portion 16. The internal shape of ball drift 19 and the diagonal slit 20 facilitate the passage of the ball drift 19 over retaining portion 16, as pressure exerted upon ball drift 19 in a direction toward body 11 causes the slit ball drift 19 to expand. The expansion of ball drift 19 is most easily accomplished when retaining portion 16 is of frusto-conical shape corresponding to the interior of ball drift 19. When ball drift 19 has been forced past retaining portion 16 it contracts and adapts itself to the shape of taper portion 15.

The ball drift 19 is inserted into condenser tube 22 and pneumatic hammer 17 or other power source is operated to force body 11 into tube 22. This causes ball drift 19 to expand along its diagonal slit 20 and travel up taper portion 15 until it abuts collar 14. Further operation then causes ball drift 19 to expand tube 22 into a tight fit within tube sheet 23, and finally the wedge portion 13 reaches the end of condenser tube 22 and flares it outwardly against the flared opening 24. The spacing of wedge portion 13 from the taper portion 15 is determined by the thickness of tube sheet 23, the spacing being such that the wedge portion 13 reaches the end of condenser tube 22 and flares it outwardly as ball drift 19 penetrates beyond the tube sheet 23.

The surface of the ball drift 19 being highly polished, the resulting inner surface of the tube 22 is correspondingly smooth and polished. To remove the tube expander, body 11 is withdrawn slightly, causing ball drift 19 to travel down taper portion 15 and contract correspondingly, permitting easy withdrawal.

The ball drift 19 can be readily and quickly removed from taper portion 15, recesses 21 affording opportunity for tools or other devices, such as vice jaws, to be bought into bearing engagement with that end of ball drift 19 adjacent collar 14. Ball drift 19 can be expanded slightly in any desired fashion, as by turning a screw driver in slot 20, and the ball drift 19 readily removed past retaining portion 16, or body 11 easily removed from within the ball drift 19.

Body 11, combining tool shank 12, wedge portion 13, collar 14, taper portion 15, and retaining portion 16 in a unitary structure affords the tube expander maximum strength and simplicity, eliminating numerous steps of assembly and disassembly. Retaining portion 16, integral with body 11, in combination with recesses 21 permits the application and removal of ball drift 19 with ease and speed. The integral retaining portion 16 retains ball drift 19 effectively through extended periods of work, and is unaffected by shock and vibration such as results from the operation of pneumatic hammers.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A tube expander comprising a body, a taper portion near one end of the body and tapering inwardly toward said end, an expansible ball drift mounted for sliding movement on said taper portion, a retaining enlargement at the narrow end of and integral with said taper portion, said enlargement being tapered in the same direction as said taper portion, said ball drift in expanded condition being capable of passing over said enlargement, and an enlargement at the large end of said taper portion forming a transverse shoulder for limiting sliding movement and expansion of said ball drift.

2. A tube expander comprising a body, a frusto-conical taper portion near one end of the body and tapering inwardly toward said end, an expansible ball drift mounted for sliding movement on said taper portion, a frusto-conical retaining enlargement at the narrow end of and integral with said taper portion, said enlargement being tapered in the same direction as said taper portion, the maximum diameter of said enlargement being less than the maximum diameter of said taper portion and more than the minimum diameter of said taper portion, said ball drift in expanded condition being capable of passing over said enlargement and an enlargement at the large end of said taper portion forming a transverse shoulder for limiting sliding movement and expansion of said ball drift.

3. A tube expander comprising a body, a taper portion near one end of the body and tapering inwardly toward said end, an expansible ball drift mounted for sliding movement on said taper portion, a retaining enlargement at the narrow end of and integral with said taper portion, said ball drift in expanded condition being capable of passing over said enlargement, and an enlargement at the large end of said taper portion forming a transverse shoulder for limiting sliding movement and expansion of said ball drift.

4. A tube expander comprising a body, a taper portion near one end of the body and tapering inwardly toward said end, an expansible ball drift mounted for sliding movement on said taper portion, a retaining enlargement at the narrow end of and integral with said taper portion, said ball drift in expanded condition being capable of passing over said enlargement, and means at the large end of said taper portion for limiting sliding movement and expansion of said ball drift.

GEORGE A. GEYER.

REFERENCES CITED

The following references are of record in the file of this patent:

UNITED STATES PATENTS

| Number | Name | Date |
| --- | --- | --- |
| 684,661 | Young et al. | Oct. 15, 1901 |
| 784,934 | Freebury | Mar. 14, 1905 |
| 924,049 | Faessler | June 8, 1909 |
| 943,907 | Austin | Dec. 21, 1909 |
| 1,161,078 | Slade | Nov. 23, 1915 |
| 1,647,447 | Hartnett | Nov. 1, 1927 |
| 2,155,416 | Geyer | Apr. 25, 1939 |